(12) United States Patent
Xiong (10) Patent No.: US 12,148,400 B1
(45) Date of Patent: Nov. 19, 2024

(54) MULTI-SCREEN DISPLAY (71) Applicant: Shenzhen Huazhixin Optoelectronics Co., Ltd., Shenzhen (CN)

(72) Inventor: Chaoyuan Xiong, Shenzhen (CN)

( * ) Notice: Subject to any disclaimer, the term of this patent is extended or adjusted under 35 U.S.C. 154(b) by 0 days.

(21) Appl. No.: 18/415,800

(22) Filed: Jan. 18, 2024

(30) Foreign Application Priority Data

Dec. 29, 2023 (CN) .......................... 202323659402.6

(51) Int. Cl.
G09G 3/36 (2006.01)
G06F 3/14 (2006.01)
G06F 3/02 (2006.01)

(52) U.S. Cl.
CPC .............. *G09G 3/36* (2013.01); *G06F 3/1423* (2013.01); *G06F 3/0227* (2013.01); *G09G 2300/026* (2013.01)

(58) Field of Classification Search
CPC .... G06F 3/1446; G06F 3/1423; G06F 3/0227; G09G 2300/026; G09G 2360/04; G09G 5/363; G09G 3/36
See application file for complete search history.

(56) References Cited

U.S. PATENT DOCUMENTS

| | | | | |
|---|---|---|---|---|
| 2010/0053475 | A1* | 3/2010 | Han | H04N 9/3141 340/815.65 |
| 2014/0347343 | A1* | 11/2014 | Chae | G09G 3/3696 345/212 |
| 2016/0117793 | A1* | 4/2016 | Sierra | G06F 3/1438 345/502 |
| 2018/0241161 | A1* | 8/2018 | Hsu | H01B 11/1834 |
| 2019/0103925 | A1* | 4/2019 | Wade | H04B 15/06 |
| 2020/0371980 | A1* | 11/2020 | Pan | G06F 13/4022 |
| 2020/0372852 | A1* | 11/2020 | Ishiwata | G09G 3/2096 |
| 2022/0188056 | A1* | 6/2022 | Qi | G06F 3/1446 |
| 2022/0310024 | A1* | 9/2022 | Gao | G09G 5/10 |
| 2023/0098532 | A1* | 3/2023 | Lai | G06F 1/3234 345/156 |

\* cited by examiner

*Primary Examiner* — Matthew A Eason
*Assistant Examiner* — Sujit Shah (57) ABSTRACT

A multi-screen display includes a plurality of display screens, a data port, a data expansion module, a plurality of decoders, and a plurality of data converters. The data port is for connecting to external devices to receive display data. The data expansion module is for expanding the display data into a plurality of separate routes corresponding to the plurality of display screens. Each decoder is electrically connected to the data expansion module. Each decoder is corresponding to one of the plurality of routes of display data respectively, and each decoder is used for receiving its corresponding route of display data and decoding it into a first data. Each data converter is electrically connected to a corresponding decoder and a corresponding display screen. Each data converter is for receiving the first data and converting it into a second data, and then providing the second data to the corresponding display screen.

13 Claims, 6 Drawing Sheets

MULTI-SCREEN DISPLAY

CROSS-REFERENCE TO RELATED APPLICATION

The application claims priority of Chinese patent application CN 202323659402.6, filed on Dec. 29, 2023, which is incorporated herein by reference in its entireties.

TECHNICAL FIELD

This invention relates to the field of display technology, particularly to a multi-screen display and a driving module built into the multi-screen display.

BACKGROUND ART

With the advancement of graphics card technology, materials such as videos, pictures, and PowerPoint presentations often need to be displayed in various settings including home entertainment, office design, business meetings, supermarkets, and banks. Additionally, utilizing a plurality of screens can facilitate design work and other tasks, allowing users to operate or demonstrate different content on separate displays, which is convenient for multitasking. Currently, computers are typically connected to two or more independent displays using cables. However, this method is limited by the number and capacity of the computer's ports and the hardware system, which restricts the number of independent displays that can be connected. Furthermore, installation and usage require separate power sources and cables, resulting in a plethora of wires and a complex setup process, creating clutter, inconvenience, and high costs.

SUMMARY

According to a first aspect of the invention, an exemplary multi-screen display includes a plurality of display screens, a data port, a data expansion module, a plurality of decoders, and a plurality of data converters. The data port is for connecting to external devices to receive display data. The data expansion module is electrically connected to the data port, and the data expansion module is configured for expanding the display data into a plurality of separate routes corresponding to the plurality of display screens. Each decoder is electrically connected to the data expansion module. Each decoder is corresponding to one of the plurality of routes of display data respectively, and each decoder is used for receiving its corresponding route of display data and decoding it into a first data. Each data converter is electrically connected to a corresponding decoder and a corresponding display screen. Each data converter is configured for receiving the first data and converting it into a second data, and then providing the second data to the corresponding display screen to drive the display screen for displaying image.

Further, both the data port and the data expansion module support the USB 3.0 communication protocol; the display data is data in USB 3.0 format, and the data expansion module is used for receiving one route of data in the USB 3.0 format, and outputting a plurality of routes of the data in the USB 3.0 format respectively to the plurality of the decoders.

Further, the decoder is a USB to HDMI decoder, and the first data output is data in HDMI format.

Further, the data converter is an HDMI to EDP data converter, the second data is data in EDP format; the display screen is a liquid crystal display screen.

Further, the data port is a combination port of data and power, and the data port comprises power supply terminals and data terminals.

Further, the multi-screen display further includes a power supply port or the combination port of data and power, the power supply port or the combination port of data and power are used for connecting an external device or another external device to receive a first power supply signal. The first power supply signal is provided to the data expansion module, the decoder, the data converter, and the display screen.

Further, the data port is a Type-C port; the power supply port is a Type-C port.

Further, the data expansion module comprises a data expansion chip and a first power supply module that electrically connects to the data expansion chip. The data expansion chip is used to convert the display data into a plurality of routes of display data; the first power supply module is used for receiving the first power supply signal and supplying power to the data expansion chip.

Further, the first power supply module is for converting the first power supply signal into a second power supply signal and a third power supply signal, and providing the first power supply signal, the second power supply signal and the third power supply signal to the data expansion chip; the first power supply signal, the second power supply signal, and the third power supply signal are respectively 5V, 3.3V, and 1.2V.

Further, the decoder comprises a decoding chip and a second power supply module electrically connected to the decoding chip, the decoding chip is for decoding the display data to obtain the first data, the second power supply module is for receiving the first power supply signal and supplying power to the decoding chip.

Further, the second power supply module is for converting the first power supply signal into the fourth power supply signal, the fifth power supply signal, and the sixth power supply signal, and providing the fourth power supply signal, the fifth power supply signal, and the sixth power supply signal to the decoding chip; the fourth power supply signal, the fifth power supply signal, and the sixth power supply signal are respectively 3.3V, 1.1V, and 2.5V.

Further, wherein the data converter comprises a data conversion chip and a third power supply module electrically connected to the data conversion chip, the data conversion chip is for converting the format of the first data to obtain the second data, the third power supply module is for receiving the first power supply signal and supplying power to the data conversion chip.

Further, the third power supply module is for converting the first power supply signal into a seventh power supply signal and an eighth power supply signal; the seventh power supply signal and the eighth power supply signal are respectively 3.3V, 1.1V.

Further, the multi-screen display further comprising a display panel and a fourth power supply module electrically connected to the display panel, wherein the display panel is for receiving the second data for displaying image, the fourth power supply module is for receiving the first power supply signal and supplying power to the display panel.

Further, the fourth power supply module is for converting the first power supply signal into a ninth power supply signal and a tenth power supply signal; the ninth power supply signal and the tenth power supply signal are respectively 3.3V, 12V.

Further, wherein the multi-screen display further comprises a control module, which is electrically connected to at least one of the data port, the data expansion module, the plurality of decoders and the plurality of data converters, the control module is configured for detecting and/or controlling at least one of the data port, the data expansion module, the plurality of decoders, and the plurality of data converters.

Further, the multi-screen display further comprises a keypad module, the keypad module is electrically connected to the control module, and the keypad module is used to generate a key signal based on user operation, the control module is for receiving the key signal and controlling one or more of the data expansion module, the decoders, the data converters, and the display screen to turn on and off according to the key signal.

Further, the multi-screen display further comprises an indicator light module, which is for indicating a working status of the multi-screen display.

Further, the multi-screen display further comprises a power management module, and the power management module is electrically connected between the power supply port and the data expansion module, or between the combined port of data and power supply port and the data expansion module.

According to a second aspect of the invention, a driving module integrated within a multi-screen display, situated inside the multi-screen display screens, is provided. The driving module includes a data port, a data expansion module, a plurality of decoders, a plurality of data converters. The data port is for connecting external devices to receive display data. The data expansion module is electrically connected to the data port, and the data expansion module is used for expanding the display data into a plurality of routes of display data corresponding to a plurality of display screens. Each decoder is electrically connected to the data expansion module. Each decoder is corresponding to one route of the display data and each is used to receive its corresponding route of the display data and decode it into a first data form. Each data converter is electrically connected to a corresponding decoder and a corresponding display screen, and is used to receive the first data and convert it into a second data, and to provide the second data to the corresponding display screen to drive the display screen for image display.

The present invention has the following beneficial effect: compared to the prior art, the multi-screen display provided by the present invention first adopts the data expansion module to convert the display data so as to obtain the a plurality routes of first data, and then sets a plurality of decoders to receive the plurality routes of display data converted by the data expansion module one by one and carry out the decoding and conversion to obtain the plurality routes of second data. Finally, the plurality of second data is converted into data that can be displayed by the plurality of display screens through the plurality of data converters, thereby enabling the plurality of display screens to display corresponding image information respectively. Further, the present invention realizes that a data display of multiple screens can be realized by connecting a data cable or a data cable plus a power supply port through the steps of expanding, decoding, and converting the data. Moreover, the number of display screens can be increased or decreased as needed, which not only avoids the limitation of the number of data interfaces and reduces the requirements of the hardware system, but also effectively reduces the number of data cables, power cables, and other wires, which effectively reduces the production cost. It also makes the installation of the product easy and fast, realizes the overall control and coordination of the product, makes it easy to use, and the whole is more beautiful and neat.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 1:
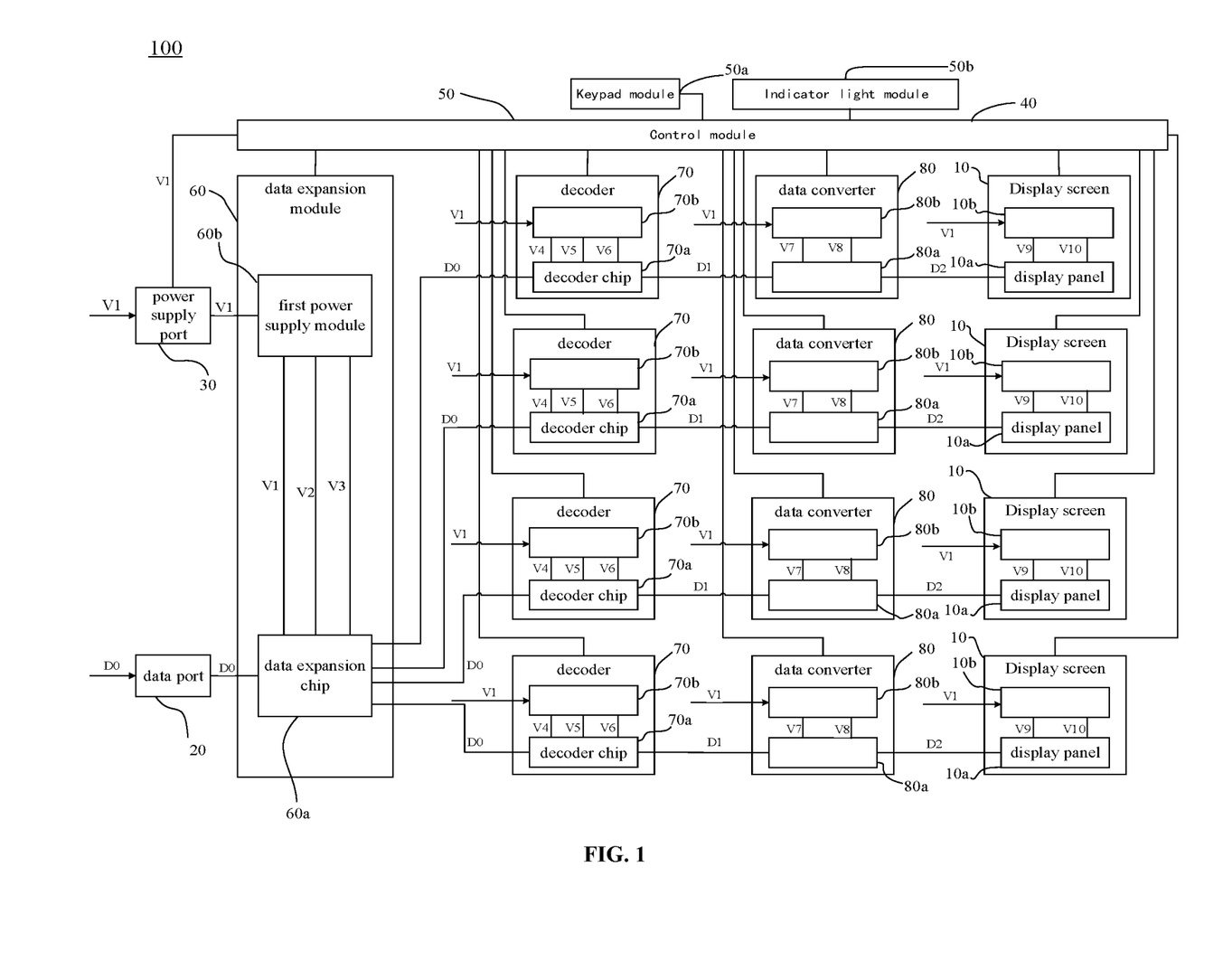
FIG. 1 shows a schematic diagram of a circuit block of a multi-screen display of the present invention.

Referring to FIG. 1, an embodiment of the present invention provides a multi-screen display 100. The multi-screen display 100 includes a plurality of display screens 10, a data port 20, a power supply port 30, a control module 40, a keypad module 50a, an indicator light module 50b, a data expansion module 60, a plurality of decoders 70 and a plurality of data converters 80.

The data port 20 is used to connect an external device (e.g., electrically connecting to an external device, such as a computer host via a data cable) to receive the display data DO. The data port 20 may support a USB communication protocol, specifically, but not limited to the above, and the display data received by the data port 20 is in USB 3.0 format. Specifically, the data port 20 may be a Type-C port, and specifically, the data port includes a power supply terminal and a data terminal.

In this embodiment, the multi-screen display 100 includes a power supply port 30 and a data port 20, the power supply port 30 is used to connect an external device (i.e., an external device connected to the data port 20) or another external device to receive the first power supply signal V1, and the first power supply signal V1 is used to be supplied to the data expansion module 60, the decoder 70, the data converter 80, and the display 10, such that the data expansion module 60, decoder 70, data converter 80 and display screen 10 obtain an operating voltage. The power supply port 30 may also be a Type-C port, without being limited as described above.

Figure 2:
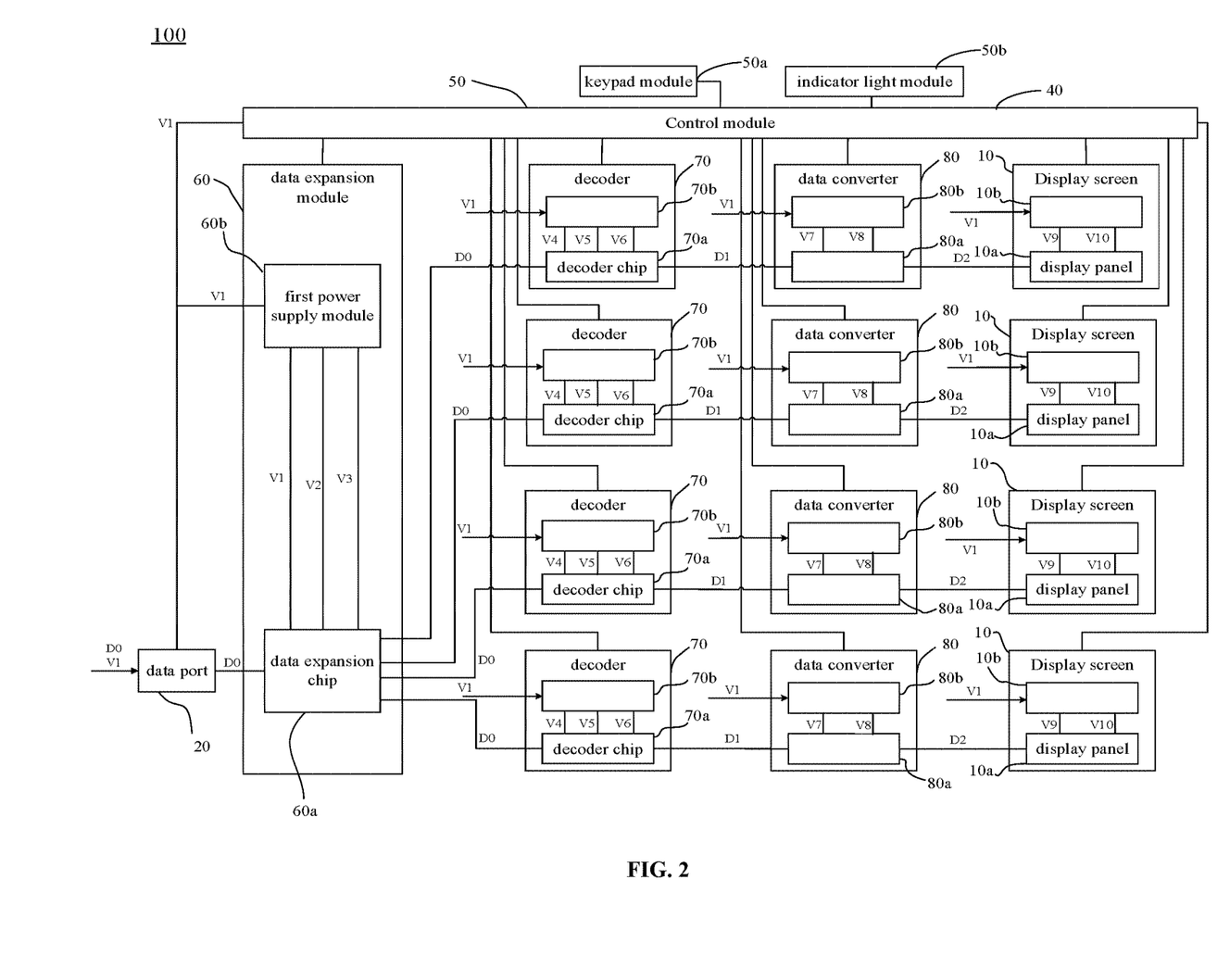
FIG. 2 shows a schematic diagram of the circuitry of a variant embodiment of the multi-screen display of the present invention.

As shown in FIG. 2, in a variant embodiment, the data port 20 is a two-in-one data and power supply port. At this time, compared to FIG. 1, the power supply port 30 may also be omitted. The power terminal of the data port 20 may receive the first power supply voltage V1, and the data terminal of the data port 20 may receive the display data DO. It can be understood that the simultaneous transmission of power supply and data can be realized through a single data port 20 (i.e., a single data cable), which may make the use of the multi-screen display 100 more convenient, less costly, and with a better user experience.

The first power supply voltage V1 may be 5 Volts (V), but is not limited as such.

The data expansion module 60 may support the USB 3.0 communication protocol. The data expansion module 60 is used to receive one route (i.e., one way) of data in USB 3.0 format and output a plurality of routes of data in USB 3.0 format to a plurality of decoders 70 respectively.

The plurality of decoders 70 are electrically connected to the data expansion module 60, and the plurality of decoders 70 correspond to the plurality of display data DO respectively, and each decoder 70 is used to receive the corresponding display data DO and to decode and convert the display data DO into the first data D1. Specifically, the decoder 70 may be a USB to HDMI decoder, and the first data D1 may be data in HDMI format, but is not limited to the above.

Each of the plurality of data converters 80 is electrically connected to a corresponding decoder 80 and a corresponding display 10, respectively. Each of the data converters 80 is used to receive the first data D1 and convert the first data D1 to the second data D2, and to provide the second data D2 to the corresponding display screen 10 to drive the display screen 10 to perform image display. Specifically, the data converter 80 may be an HDMI to EDP data converter 80, and the second data D2 may be in EDP (Embedded Display Port, EDP) format. The display screen 10 may be an LCD display, but is limited to the above.

It is understood that HDMI refers to High Definition Multimedia Interface, which is a fully digital video and sound transmission interface that can send uncompressed audio and video signals. HDMI can be used in set-top boxes, DVD players, personal computers, televisions, gaming consoles, integrated amplifiers, digital stereos and televisions, and other devices. HDMI can send both audio and video signals simultaneously, and since the audio and video signals are sent using the same cable, it greatly simplifies the process. HDMI can send both audio and video signals, due to the audio and video signals with a cable, greatly simplifying the installation of the system line difficulty. EDP format is a standard protocol in the field of digital display technology, its founder for the Video Electronics Standards Association (VESA), the EDP protocol for the DP (Display Port) applications in the direction of the embedded architecture and expansion of protocols, so the EDP protocol is fully compatible with the DP protocol. Compared to DVI/HDMI, EDP has high bandwidth, good integration, and related product design simplicity, the interface can be used in laptops, tablets, cell phones, and other integrated display panels and image processors in the field. EDP interface reduces the complexity of the device to support the necessary functions of key cross-industry applications. The EDP interface provides performance scalability to support higher color depth, refresh rate and display quality. The EDP interface provides performance scalability to support next generation displays with higher color depths, refresh rates, and display resolutions.

Further, the data expansion module 60 may include a data expansion chip 60a and a first power supply module 60b electrically coupled to the data expansion chip 60a. The data expansion chip 60a is used to convert the display data DO to a plurality of routes of display data DO. The first power supply module 60b is used to receive a first power supply signal V1 and supply power to the data expansion chip 60a. The first power supply module 60b is used to convert the first power supply signal V1 into a second power supply signal V2 and a third power supply signal V3, and to provide the first power supply signal V1, the second power supply signal V2 and the third power supply signal V3 to the data expansion chip 60a. The first power supply signal V1, the second power supply signal V2 and the third power supply signal V3 may be 5 Volts (V), 3.3V and 1.2V, respectively, but are not limited to the above.

Further, the decoder 70 includes a decoder chip 70a and a second power supply module 70b electrically connected to the decoder chip 70a, wherein the decoder chip 70a is used to decode the display data DO to obtain the first data D1, and the second power supply module 70b is used to receive the first power supply signal V1 and supply power to the decoder chip 70a. Specifically, the second power supply module 70b may convert the first power supply signal V1 into a fourth power supply signal V4, a fifth power supply signal V5, and a sixth power supply signal V6, and provide the fourth power supply signal V4, the fifth power supply signal V5, and the sixth power supply signal V6 to the decoder chip 70a. The fourth power supply signal V4, the fifth power supply signal V5, and the sixth power supply signal V6 are 3.3 Volts (V), 1.1 V, and 2.5 V, but are not limited to the above.

Further, the data converter 80 includes a data conversion chip 80a and a third power supply module 80b electrically connected to the data conversion chip 80a. The data conversion chip 80a is used for converting format of the first data D1 to obtain the second data D2, and the third power supply module 80b is used for receiving the first power supply signal V1 and supplying power to the data conversion chip 80b. Specifically, the third power supply module 80b may be used to convert the first power supply signal V1 into a seventh power supply signal V7 and an eighth power supply signal V8. The seventh power supply signal V7 and the eighth power supply signal V8 are 3.3 Volts (V) and 1.1 V respectively, but not limited to the above.

Further, the display screen 10 further comprises a display panel 10a and a fourth power supply module 10b electrically connected to the display panel 10a. The display panel 10a is used to receive the second data D2 for displaying image, and the fourth power supply module 80b is used to receive the first power supply signal V1 and supply power to the display panel 10a. Specifically, the fourth power supply module 10b is used to convert the first power supply signal V1 into a ninth power supply signal V9 and a tenth power supply signal V10. The ninth power supply signal V9 and the tenth power supply signal V10 are 3.3 V and 12 V, respectively, but not limited to the above.

In addition, the control module 40 is electrically connected to at least one of the data port 20, the power supply port 30, the data expansion module 60, the plurality of decoders 70, and the plurality of data converters 80 to detect and/or control at least one of the data port 20, the power supply port 30, the data expansion module 60, the plurality of decoders 70, the plurality of data converters 80, and the display 10.

The keypad module 50a may be electrically connected to the control module 40, and the keypad module 50a is used to generate a key signal based on a user's operation, and the control module 40 is used to receive the key signal and control one or more of at least one of the data expansion module 60, the plurality of decoders 70 and the plurality of data converters 80, and the plurality of display screens 10 to be turned on and off based on the key signal.

The indicator light module 50b may be electrically connected to the control module 40 and is used to indicate an operating state of the plurality of displays 100.

Figure 3:
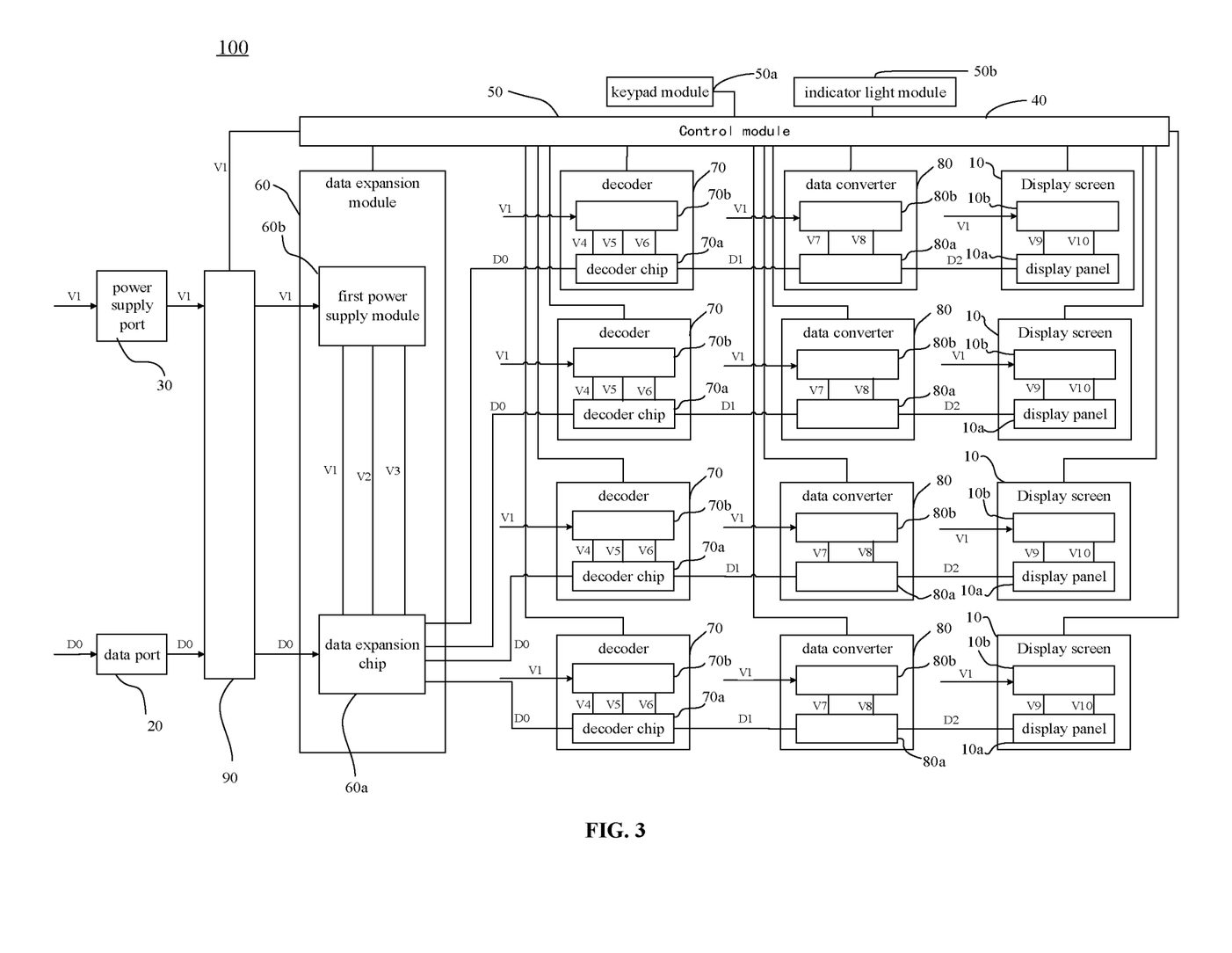
FIG. 3 shows a schematic diagram of a circuit block of another variant embodiment of the multi-screen display of the present invention.

As shown in FIG. 3, in yet another alternative embodiment, the multi-screen display 100 further includes a power management module 90, which is electrically connected between the power supply port 20 and the data expansion module 60, or between the two-in-one port of data and power and the data expansion module 60. The power management module 90 is also electrically connected to the control module 40.

Each power supply module may filter, stabilize, and raise or lower the voltage of the first power supply signal V1, so as to make the first power supply signal V1 more stable and reduce the occurrence of interference and other situations, thereby realizing the protection of other modules or components and enhancing the service life of the product. The power management module 90 may include a power management chip for detecting the signals of the data port 20 and/or the power supply port 30 to prevent insecurity caused by the reversal of the data lines to protect the multi-screen display 100.

It is understood that the multi-screen display 100 provided by the present invention may be provided with two, three or more than three display screens 10. The user may increase or decrease the number of display screens 10 according to actual needs.

At least one data port 20 is also provided on the multi-screen display 100 to receive display data from an external device, and in this embodiment, the data port 20 is a Type-C data port 20 and the power supply port 30 is a Type-C data port 20, and the data port 20 and the power supply port 30 are two different ports with different roles, i.e., the data port 20 is used to receive display data from an external device only, and the power supply port 30 is only used to receive the first power supply signal V1 and provide it to the other modules. In other embodiments, both the data port 20 and the power supply port 30 can receive display data of the external device, and can also receive the first power supply signal V1 and provide it to the data expansion module 60, the decoder 70, the data converter 80, and the display 10, i.e., they have the same functional role. The data port 20 may also be the power supply port 30, and the power supply port 30 may also be the data port 20, i.e. the functions of the two are interchangeable.

After receiving the display data, the display data to be displayed is converted into 2, 3, or more than 3 routes of the first data by the internally provided data expansion module 60, i.e., the total number of routes of the converted first data is determined according to the total number of the display screens 10. Then the first data of 2, 3 or more than 3 routes (ways) is decoded and converted through a corresponding number of decoders 70, and then the obtained data is transmitted to the corresponding display screen 10 through the data converter 80, wherein the quantity of the data converters 80 also corresponds to 2, 3 or more than 3 routes. That is, if three display screens 10 are required, the data expansion module 60 converts the display data DO received by the data port 20 into 3-route display data DO, and decodes and converts the respectively received 3-route display data DO into 3-route first data through the three decoders 70, and then converts the 3-route first data into 3-route second data through the three data converters 80 one by one, respectively, and transmitted to the three display screens 10 for display, thereby realizing the image display of the plurality of display screens 10.

Figure 4:
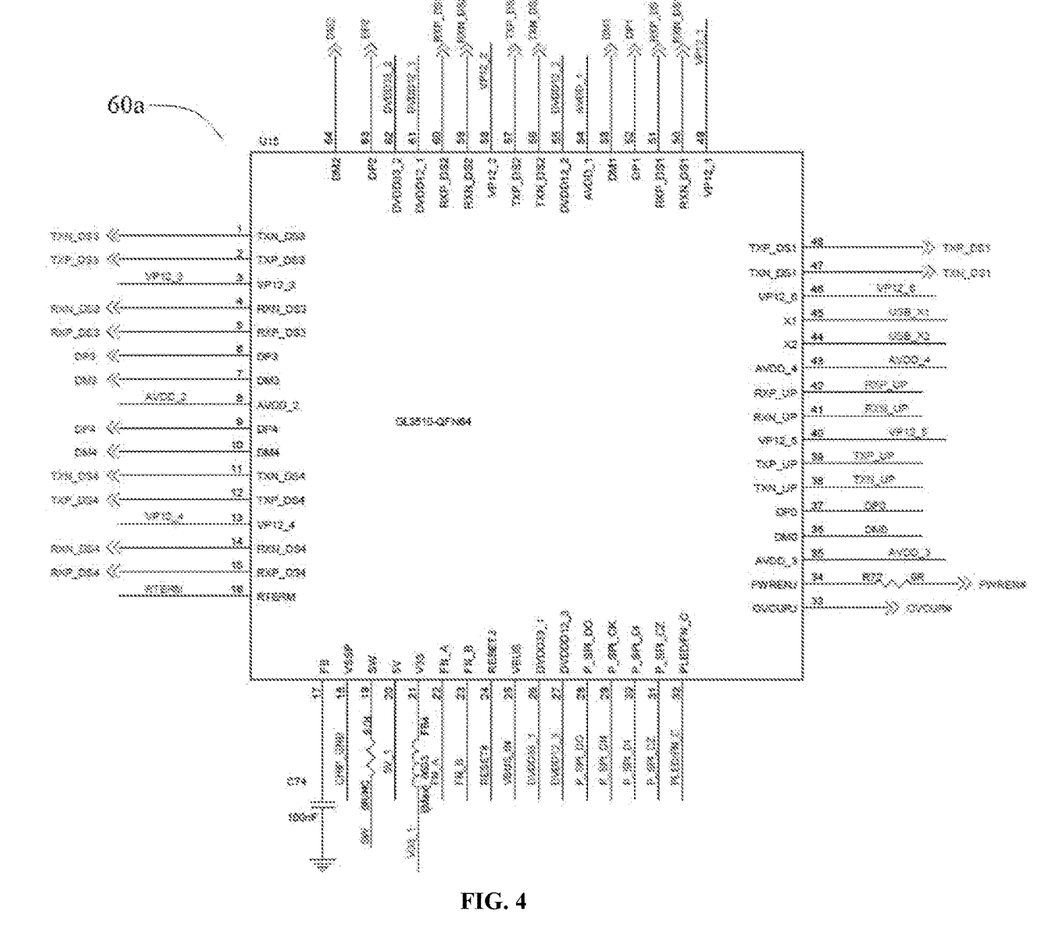
FIG. 4 shows a circuit diagram of a data expansion chip of the multi-screen display of the present invention.

Referring to FIG. 1, in the embodiment shown in the present invention, the data expansion module 60 includes a data expansion chip 60a and a first power supply module 60b, and the data expansion chip 60a adopts a GL3510 chip or a chip of the same performance. Referring specifically to FIG. 4, FIG. 4 shows a circuit diagram of the data expansion chip 60a of the multi-screen display 100 of the present invention. The pin functions of the data expansion chip 60a shown in FIG. 4 are shown in Table 1 below.

TABLE 1

The pin functions of the data expansion chip 60a
USB Interface

| Pin Name | QFN64 | Type | Descriptions |
|---|---|---|---|
| TXN1-P0 | 38 | O | USB3.1 Gen 1 Differential Data Transmitter |
| TXP1-P0 | 39 | | TX−/TX+ ofUSPORT |
| RXN1-P0 | 41 | I | USB3.1 Gen 1 Differential Data Receiver |
| RXP1-P0 | 42 | | RX−/RX+ ofUSPORT |
| TXN1-P1 | 47 | O | USB3.1 Gen 1 Differential Data Transmitter |
| TXP1-P1 | 48 | | TX−/TX+ ofDSPORTI |
| RXN1-P1 | 50 | I | USB3.1 Gen 1 Differential Data Receiver |
| RXP1-P1 | 51 | | RX−/RX+ ofDSPORT1 |
| TXN1-P2 | 56 | O | USB3.1 Gen 1 Differential Data Transmitter |
| TXP1-P2 | 57 | | TX−/TX+ ofDSPORT2 |
| RXN1-P2 | 59 | I | USB3.1 Gen 1 Differential Data Receiver |
| RXP1-P2 | 60 | | RX−/RX+ ofDSPORT2 |
| TXN1-P3 | 1 | O | USB3.1 Gen 1 Differential Data Transmiter |
| TXP1-P3 | 2 | | TX−/TX+ OfDSPORT3 |
| RXN1-P3 | 4 | I | USB3.1 Gen 1 Differential Data Receiver |
| RXP1-P3 | 5 | | RX−/RX+ of DSPORT3 |
| TXN1-P4 | 11 | O | USB3.1 Gen 1 Differential Data Transmitter |
| TXP1-P4 | 12 | | TX−/TX+ ofDSPORT4 |
| RXN1-P4 | 14 | I | USB3.1 Gen 1 Differential Data Receiver |
| RXP1-P4 | 15 | | RX−/RX+ ofDSPORT4 |
| DM-P0 | 36 | B | USB 2.0 DM/DP for USPORT |
| DP-P0 | 37 | | |

TABLE 1-continued

The pin functions of the data expansion chip 60a
USB Interface

| Pin Name | QFN64 | Type | Descriptions |
|---|---|---|---|
| DM-P1 | 53 | B | USB 2.0 DM/DP for DSPORT |
| DP-P1 | 52 | | |
| DM-P2 | 64 | B | USB 2.0 DM/DP for DSPORT2 |
| DP-P2 | 63 | | |
| DM-P3 | 7 | B | USB 2.0 DM/DP for DSPORT3 |
| DP-P4 | 6 | | |
| DM-P4 | 10 | B | USB 2.0 DM/DP for DSPORT4 |
| DP-P4 | 9 | | |

As can be obtained from Table 1 above, the GL3510 chip used as the Data Expansion Chip 60a is a 4-port, low-power, configurable hub controller that complies with the USB 3.1 specification, supports Super-Speed, Hi-Speed, and Full-Speed USB connectivity, and is fully backward compatible with all USB 2.0 and USB 1.1 hosts. And the Data Expansion Module 60 has built-in regulators such as 5V to 3.3V and 5V to 1.2V to regulate the power supply, which saves cost and simplifies PCB design. In addition, the GL3510 chip has a native fast charging feature that also allows portable devices to draw up to current of 1.5 ampere (A) from the GL3510 charging downstream port (CDP1) or dedicated charging port (DCP2).

Figure 5:
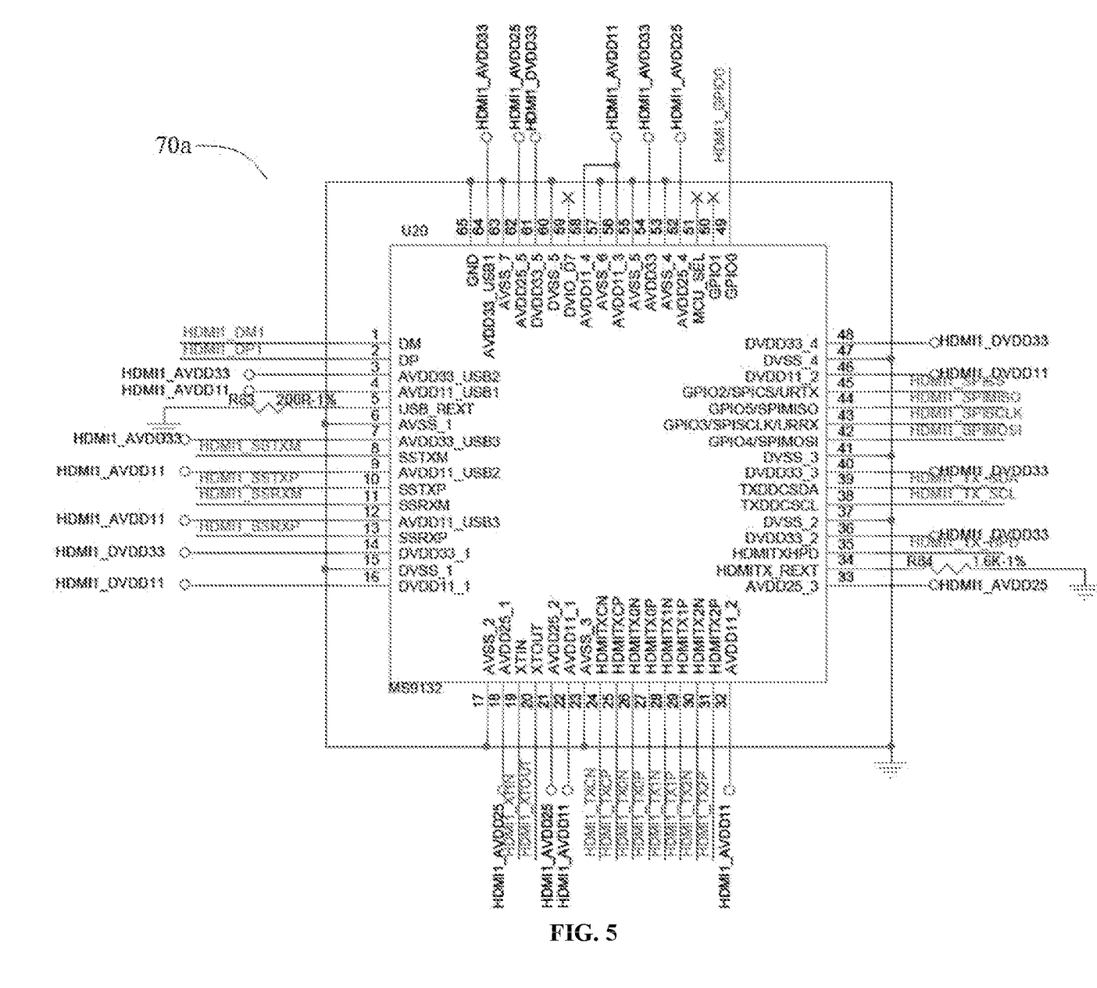
FIG. 5 is a circuit diagram of a decoding chip for the multi-screen display of the present invention.

Referring to FIG. 1, the decoder 70 includes a decoder chip 70a and a second power supply module 70b, and the decoder chip 70a is specifically an MS9132 chip or a chip of the same performance, and the MS9132 chip is a USB3.0 projection chip, with an integrated USB3.0 Device Controller, data transmitting and receiving module, and an audio and video processing module. The MS9132 chip can display or extend the information on PC, smart phone, tablet PC to a larger size display device through the USB3.0 interface, supporting HD video interface output. Referring to FIG. 5, FIG. 5 shows a circuit diagram of the decoder chip 70a of the multi-screen display 100 of the present invention. The pin functions of the decoder chip 70a shown in FIG. 5 are shown in Table 2 below.

TABLE 2

The pin functions of the decoder chip 70a

| Pin name | Pin number | type | description |
|---|---|---|---|
| HDMITX2P | 31 | Digital output | HDMI Transmitter Differential Channel 2 Data Input Positive Signal |
| HDMITX-REXT | 34 | Analog output | Connect a 1.6 k resistor to ground |
| HDMITXHPD | 35 | Digital input | HDMI Transmitter Hot Swap Signal Output |
| TXDDCSDA | 39 | Digital input/output | HDMI transmitter display data channel midline data bus |
| TXDDCSCL | 38 | Digital output | HDMI transmitter display data channel serial clock bus |
| USB | | | |
| DP | 2 | Digital input/output | USB2.0 Differential Positive Signal |
| DM | 1 | Digital input/output | USB2.0 Differential Negative Signal |
| USB-REXT | 5 | analog output | 200 ohm resistor to ground |
| SSTXP | 10 | Digital output | USB3.0 Differential Positive Output Signal |
| SSTXM | 8 | Digital output | USB3.0 Differential Output Negative Signal |
| SSRXP | 13 | Digital input | USB3.0 Differential Input Positive Signal |
| SSRXM | 11 | Digital input | USB3.0 Differential Input Negative Signal |
| HDMI TX | | | |
| HDMITXCN | 24 | Digital output | HDMI Transmitter Differential Clock Input Negative Signal |
| HDMITXCP | 25 | Digital output | HDMI send-side differential clock input positive signal |
| HDMITX0N | 26 | Digital output | HDMI send-side differential channel 0 data input negative signal |
| HDMITX0P | 27 | Digital output | HDMI transmitter differential channel 0 Positive data input signal |
| HDMITX1N | 28 | Digital output | HDMI transmitter differential channel 1 Negative data input signal |
| HDMITX1P | 29 | Digital output | HDMI Send Differential Channel 1 Positive Data Input Signal |
| HDMITX2N | 30 | Digital output | HDMI send differential channel 2 Negative data input signal |

Figure 6:
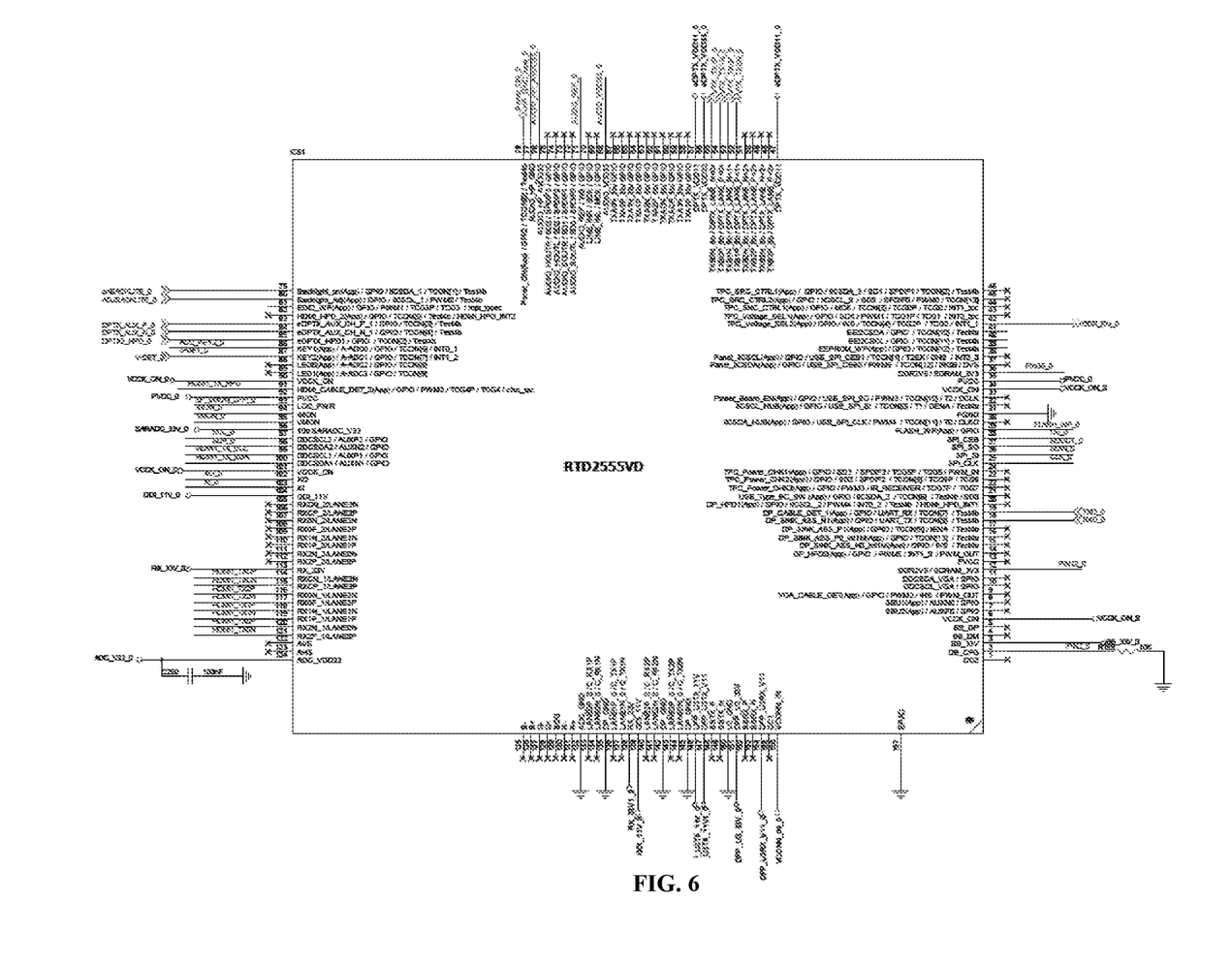
FIG. 6 is a circuit diagram of a data conversion chip for the multi-screen display of the present invention.

Continuing to refer to FIG. 1, the data converter 80 in the present invention includes a data conversion chip 80a and a third power supply module 80b. The data conversion chip 80a is used to convert the second data to the second data, specifically the chip of RTD2566 or a chip of the same performance. Referring to FIG. 6, FIG. 6 is a circuit diagram of the data converter chip 80a of the present multi-screen display 100 of the present invention. The function of each pin of the data converter 80 chip shown in FIG. 6 is shown in Table 3 below.

TABLE 3

The function of each pin of the data converter 80 chip

| Pin name | I/O | Pin number | Description | annotation |
| --- | --- | --- | --- | --- |
| TXB2N-8b/DPTX-LANE-N<2> | AO | 51 | LVDS/eDPTX | 3.3 V Tolerance |
| TXB1P-8b/DPTX-LANE-P<1> | AO | 52 | LVDS/eDPTX | 3.3 V Tolerance |
| TXB1N-8b/DPTX LANE N<1> | AO | 53 | LVDS/eDPTX | 3.3 V Tolerance |
| TXB0P-8b/DPTX-LANE-P<0> | AO | 54 | LVDS/eDPTX | 3.3 V Tolerance |
| TXB0N-8b/DPTX LANE N<0> | AO | 55 | LVDS/eDPTX | 3.3 V Tolerance |
| AUDIO-REF/WS/GPIO | AIO | 71 | AUDIO-REF/I2S/MCU-GPIO | 3.3 V Tolerance |
| AUDIO-SOUTLI/SD0/SPDIF0/GPIO | AIO | 72 | AUDIO-SOUTL/I2S/SPDIF/MCU GPIO | 3.3 V Tolerance |
| AUDIO-SOUTR/SD1/SPDIF1/GPIO | AIO | 73 | AUDIO-SOUTR/I2S/SPDIF/MCU GPIO | 3.3 V Tolerance |
| AUDIO-HOUTL/SD2/SPDIF2/GPIO | AIO | 74 | AUDIO-HOUTL/I2S/SPDIF/MCU GPIO | 3.3 V Tolerance |
| AUDIO-HOUTR/SD3/SPDIF3/GPIO | AIO | 75 | AUDIO-HOUTL/I2S/SPDIF/MCU GPIO | 3.3 V Tolerance |
| AUDIO-HP-AVDD33 | AP | 76 | AUDIO HP 3.3 V Power | (3.3 V) |
| AUDIO -HP-GND | AG | 77 | AUDIO HP Ground | 5 V Tolerance when power off |
| GPIO/TCON[0]/Test4b | IO | 78 | MCU GPIO ITCON/Test4b | 5 V Tolerance when power off |
| GPIO/IICSDA-1/TCON[1]/Test4b | IO | 79 | MCU GPIO/IIC BUS/TCON/Test4b | 5 V Tolerance when power off |
| GPIO/IICSCL_1/PWM0/Test4b | IO | 80 | MCU GPIO/IIC BUS/PWM/Test4b | 5 V Tolerance |
| GPIO/PWM1/TCG3P/TCG3/irqb-typec | IO | 81 | MCU GPIO/PWM ITypeC GPIO | when power off |
| GPIO/TCON[5]/Test4b/HDMI-HPD_INT2 | IO | 82 | MCUGPIO/TCON/Test4b/HDMIHot-plug | 5 V Tolerance when power off |
| DDCSCL1/AUXP1/GPIO | IO | 99 | DDC Channel(Opendrain I/O)/AUX-CH/MCU GPIO | 5 V Tolerance when power off |
| DDCSDA1/AUXN1/GPIO | IO | 100 | DDC Channel (Opendrain I/O)/AUX-CH/MCU GPIO | 5 V Tolerance when power off |
| VCCK -ON | DP | 101 | Core Power | (1.1 V |
| XO | AO | 102 | Crystal Output | 3.3 V Tolerance |
| XI | AI | 103 | Crystal Input | 3.3 V Tolerance |
| GDI-11V | AP | 104 | GDI 1.1V Power | (1.1 V) |
| RXCN -2 | AI | 105 | TMDS Input | |
| RXCP -2 | AI | 106 | TMDS Input | |
| RX0N-2 | AI | 107 | TMDS Input | |
| RX0P-2 | AI | 108 | TMDS Input | |
| RX1N-2 | AI | 109 | TMDS Input | |
| RX1P-2 | AI | 110 | TMDS Input | |
| RX2N-2 | AI | 111 | TMDS Input | |
| RX2P-2 | AI | 112 | TMDS Input | |

Wherein I/O Legend (Input/Output Chip Characters): A = Analog, I = Input, O = Output, P = Power, G = Ground.

In this embodiment, in order to avoid the problem of harmonic interference, so that the data converter chip 80a receives the required stable electrical signals, through the setup of a plurality of power supply modules, the first power supply signal V1 to the ninth power supply signal V9 can be independent of each other, and they can all be filtered and stabilized and then supplied to the data expansion chip 60a, the decoder chip 70a, and the converter chip 80a.

The present invention has the following beneficial effect: compared to the prior art, the multi-screen display 100 provided by the present invention first adopts the data expansion module 60 to convert the display data DO so as to obtain the a plurality routes of first data, and then sets a plurality of decoders 70 to receive the plurality routes of display data D2 converted by the data expansion module 60 one by one and carry out the decoding and conversion to obtain the plurality routes of second data D2. Finally, the plurality of second data is converted into data that can be displayed by the plurality of display screens 10 through the plurality of data converters 80, thereby enabling the plurality of display screens 10 to display corresponding image information respectively.

Further, the present invention realizes that a data display of multiple screens can be realized by connecting a data cable or a data cable plus a power supply port through the steps of expanding, decoding, and converting the data. Moreover, the number of display screens 10 can be increased or decreased as needed, which not only avoids the limitation of the number of data interfaces and reduces the requirements of the hardware system, but also effectively reduces the number of data cables, power cables, and other wires, which effectively reduces the production cost. It also makes the installation of the product easy and fast, realizes the overall control and coordination of the product, makes it easy to use, and the whole is more beautiful and neat.

In a second aspect, embodiments of the present invention also provide a driving module built into the multi-screen display 10. The driving module may be a main control circuit board, which includes a data port 20, a power supply port 30, a control module 40, a data expansion module 60, a plurality of decoders 70, and a plurality of data converters 80 The fourth power supply module of the display may also be arranged on the main control circuit board.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A multi-screen display comprising:
   a plurality of display screens;
   a data port configured for connecting to external devices to receive display data;
   a data expansion module electrically connected to the data port, the data expansion module configured for expanding the display data into a plurality of separate routes of the display data respectively corresponding to the plurality of display screens;
   a plurality of decoders, each decoder electrically connected to the data expansion module, each decoder corresponding to one of the plurality of routes of display data respectively, and each decoder being configured for receiving the corresponding route of the display data and decoding the corresponding route of the display data into a first data; and
   a plurality of data converters, each data converter being electrically connected to a corresponding decoder and a corresponding display screen, each data converter being configured for receiving the first data and convert the first data into a second data, and providing the second data to the corresponding display screen to drive the corresponding display screen for displaying image,
   wherein the multi-screen display further comprises a power supply port or the data port is a combination port of data and power, the power supply port or the combination port of data and power is configured for connecting an external device or another external device to receive a first power supply signal, and the first power supply signal is configured to be provided to the data expansion module, the decoder, the data converter, and the display screen,
   wherein the data expansion module comprises a data expansion chip and a first power supply module electrically connected to the data expansion chip, the data expansion chip is configured for converting the display data into the plurality of routes of the display data: the first power supply module is configured for receiving the first power supply signal and supplying power to the data expansion chip,
   wherein the first power supply module is configured for converting the first power supply signal into a second power supply signal and a third power supply signal, and providing the first power supply signal, the second power supply signal and the third power supply signal to the data expansion chip, and the first power supply signal, the second power supply signal, and the third power supply signal are respectively 5V, 3.3V, and 1.2V.

2. The multi-screen display according to claim 1, wherein both the data port and the data expansion module support the USB 3.0 communication protocol: the display data is data in USB 3.0 format, and the data expansion module is configured for receiving one route of the display data in the USB 3.0 format, and outputting the plurality of routes of the display data in the USB 3.0 format respectively to the plurality of the decoders.

3. The multi-screen display according to claim 1, wherein the decoder is a USB to HDMI decoder, and the first data is data in HDMI format.

4. The multi-screen display device according to claim 1, wherein the data converter is an HDMI to EDP data converter, the second data is data in EDP format; the display screen is a liquid crystal display screen.

5. The multi-screen display device according to claim 1, wherein the data port is a Type-C port.

6. The multi-screen display device according to claim 1, wherein the decoder comprises a decoding chip and a second power supply module electrically connected to the decoding chip, the decoding chip is configured for decoding the display data to obtain the first data, the second power supply module is configured for receiving the first power supply signal and supplying power to the decoding chip.

7. The multi-screen display according to claim 1, wherein the data converter comprises a data conversion chip and a third power supply module electrically connected to the data conversion chip, the data conversion chip is configured for converting the format of the first data to obtain the second data, the third power supply module is configured for receiving the first power supply signal and supplying power to the data conversion chip.

8. The multi-screen display according to claim 1, further comprising a display panel and a fourth power supply module electrically connected to the display panel, wherein the display panel is configured for receiving the second data for displaying image, and the fourth power supply module is configured for receiving the first power supply signal and supplying power to the display panel.

9. The multi-screen display according to claim 1, wherein the multi-screen display further comprises a power management module, and the power management module is electrically connected between the power supply port and the data expansion module, or between the combined port of data and power supply port and the data expansion module.

10. The multi-screen display according to claim 1, wherein the combination port of data and power is a Type-C port.

11. A multi-screen display comprising:
   a plurality of display screens;
   a data port configured for connecting to external devices to receive display data;
   a data expansion module electrically connected to the data port, the data expansion module configured for expanding the display data into a plurality of separate routes of the display data respectively corresponding to the plurality of display screens;
   a plurality of decoders, each decoder electrically connected to the data expansion module, each decoder corresponding to one of the plurality of routes of display data respectively, and each decoder being configured for receiving the corresponding route of the display data and decoding the corresponding route of the display data into a first data; and a plurality of data converters, each data converter being electrically connected to a corresponding decoder and a corresponding display screen, each data converter being configured for receiving the first data and convert the first data into a second data, and providing the second data to the corresponding display screen to drive the corresponding display screen for displaying image, wherein the multi-screen display further comprises a power supply port or the data port is a combination port of data and power, the power supply port or the combination port of data and power is configured for connecting an external device or another external device to receive a first power supply signal, and the first power supply signal is configured to be provided to the data expansion module, the decoder, the data converter, and the display screen, wherein the data expansion module comprises a data expansion chip and a first power supply module electrically connected to the data expansion chip, the data expansion chip is configured for converting the display data into the plurality of routes of the display data; the first power supply module is configured for receiving the first power supply signal and supplying power to the data expansion chip, wherein the first power supply module is configured for converting the first power supply signal into a second power supply signal and a third power supply signal, and providing the first power supply signal, the second power supply signal and the third power supply signal to the data expansion chip, wherein the decoder comprises a decoding chip and a second power supply module electrically connected to the decoding chip, the decoding chip is configured for decoding the display data to obtain the first data, the second power supply module is configured for receiving the first power supply signal and supplying power to the decoding chip; and wherein the second power supply module is configured for converting the first power supply signal into the fourth power supply signal, the fifth power supply signal, and the sixth power supply signal, and providing the fourth power supply signal, the fifth power supply signal, and the sixth power supply signal to the decoding chip; the fourth power supply signal, the fifth power supply signal, and the sixth power supply signal are respectively 3.3V, 1.1V, and 2.5V.

12. A multi-screen display comprising:

a plurality of display screens;

a data port configured for connecting to external devices to receive display data;

a data expansion module electrically connected to the data port, the data expansion module configured for expanding the display data into a plurality of separate routes of the display data respectively corresponding to the plurality of display screens;

a plurality of decoders, each decoder electrically connected to the data expansion module, each decoder corresponding to one of the plurality of routes of display data respectively, and each decoder being configured for receiving the corresponding route of the display data and decoding the corresponding route of the display data into a first data; and a plurality of data converters, each data converter being electrically connected to a corresponding decoder and a corresponding display screen, each data converter being configured for receiving the first data and convert the first data into a second data, and providing the second data to the corresponding display screen to drive the corresponding display screen for displaying image, wherein the multi-screen display further comprises a power supply port or the data port is a combination port of data and power, the power supply port or the combination port of data and power is configured for connecting an external device or another external device to receive a first power supply signal, and the first power supply signal is configured to be provided to the data expansion module, the decoder, the data converter, and the display screen, wherein the data expansion module comprises a data expansion chip and a first power supply module electrically connected to the data expansion chip, the data expansion chip is configured for converting the display data into the plurality of routes of the display data; the first power supply module is configured for receiving the first power supply signal and supplying power to the data expansion chip, wherein the first power supply module is configured for converting the first power supply signal into a second power supply signal and a third power supply signal, and providing the first power supply signal, the second power supply signal and the third power supply signal to the data expansion chip, wherein the data converter comprises a data conversion chip and a third power supply module electrically connected to the data conversion chip, the data conversion chip is configured for converting the format of the first data to obtain the second data, the third power supply module is configured for receiving the first power supply signal and supplying power to the data conversion chip, and wherein the third power supply module is configured for converting the first power supply signal into a seventh power supply signal and an eighth power supply signal; the seventh power supply signal and the eighth power supply signal are respectively 3.3V, 1.1V.

13. A multi-screen display comprising:

a plurality of display screens;

a data port configured for connecting to external devices to receive display data;

a data expansion module electrically connected to the data port, the data expansion module configured for expanding the display data into a plurality of separate routes of the display data respectively corresponding to the plurality of display screens;

a plurality of decoders, each decoder electrically connected to the data expansion module, each decoder corresponding to one of the plurality of routes of display data respectively, and each decoder being configured for receiving the corresponding route of the display data and decoding the corresponding route of the display data into a first data; and a plurality of data converters, each data converter being electrically connected to a corresponding decoder and a corresponding display screen, each data converter being configured for receiving the first data and convert the first data into a second data, and providing the second data to the corresponding display screen to drive the corresponding display screen for displaying image, wherein the multi-screen display further comprises a power supply port or the data port is a combination port of data and power, the power supply port or the combination port of data and power is configured for connecting an external device or another external device to receive a first power supply signal, and the first power supply signal is configured to be provided to the data expansion module, the decoder, the data converter, and the display screen, wherein the data expansion module comprises a data expansion chip and a first power supply module electrically connected to the data expansion chip, the data expansion chip is configured for converting the display data into the plurality of routes of the display data; the first power supply module is configured for receiving the first power supply signal and supplying power to the data expansion chip, wherein the first power supply module is configured for converting the first power supply signal into a second power supply signal and a third power supply signal, and providing the first power supply signal, the second power supply signal and the third power supply signal to the data expansion chip, wherein the multi-screen display further comprises a display panel and a fourth power supply module electrically connected to the display panel, wherein the display panel is configured for receiving the second data for displaying image, and the fourth power supply module is configured for receiving the first power supply signal and supplying power to the display panel, and wherein the fourth power supply module is configured for converting the first power supply signal into a ninth power supply signal and a tenth power supply signal; the ninth power supply signal and the tenth power supply signal are respectively 3.3V, 12V.

* * * * *